United States Patent
Bun

(10) Patent No.: US 11,109,696 B2
(45) Date of Patent: Sep. 7, 2021

(54) FLORAL DISPLAY SYSTEMS

(71) Applicant: Michael Bun, Long Beach, CA (US)

(72) Inventor: Michael Bun, Long Beach, CA (US)

(*) Notice: Subject to any disclaimer, the term of this patent is extended or adjusted under 35 U.S.C. 154(b) by 112 days.

(21) Appl. No.: 16/681,709

(22) Filed: Nov. 12, 2019

(65) Prior Publication Data

US 2020/0170423 A1 Jun. 4, 2020

Related U.S. Application Data

(60) Provisional application No. 62/768,520, filed on Nov. 16, 2018.

(51) Int. Cl.
| | |
|---|---|
| *A47G 7/00* | (2006.01) |
| *A47G 7/06* | (2006.01) |
| *A01G 5/06* | (2006.01) |
| *F21V 23/06* | (2006.01) |
| *F21V 23/02* | (2006.01) |
| *F21W 131/405* | (2006.01) |
| *F21Y 115/10* | (2016.01) |
| *F21Y 113/17* | (2016.01) |

(52) U.S. Cl.
CPC .............. *A47G 7/006* (2013.01); *A01G 5/06* (2013.01); *A47G 7/06* (2013.01); *F21V 23/02* (2013.01); *F21V 23/06* (2013.01); *F21W 2131/405* (2013.01); *F21Y 2113/17* (2016.08); *F21Y 2115/10* (2016.08)

(58) Field of Classification Search
CPC .. A47G 7/006; A47G 7/06; A01G 5/06; F21V 33/0028; A01N 3/02
See application file for complete search history.

(56) References Cited

U.S. PATENT DOCUMENTS

| | | | | |
|---|---|---|---|---|
| 2,631,409 | A | * 3/1953 | Windiate | A47G 7/006 47/41.13 |
| 2,709,217 | A | * 5/1955 | McCluskey | F21V 31/00 362/101 |
| 4,325,110 | A | 4/1982 | Tang | |
| 6,039,453 | A | 3/2000 | Wang | |
| 7,168,820 | B1 | 1/2007 | Minassian | |
| 9,978,806 | B1 | * 5/2018 | Rapisarda | F21K 9/232 |

(Continued)

OTHER PUBLICATIONS

Website Thrifty Fun, published Jan. 6, 2010, https://www.thriftyfun.com/Preserving-Herbs-and-Flowers-in-Oil.html (Year: 2010).*

*Primary Examiner* — Evan P Dzierzynski
(74) *Attorney, Agent, or Firm* — Michael Christopher Balaguy

(57) ABSTRACT

A floral display device is disclosed herein. The device is intended to help keep cut flowers in a suspended state similar to their appearance when fresh cut. The device may include a display enclosure including a transparent shell having an interior portion adapted to contain the flowers and the liquid preservative, and an opening within the transparent shell to enable passage of the flowers and the liquid preservative therethrough, a liquid-tight closure configured to close the opening, a holding clip configured to removably hold the flowers within the interior portion. A base may be removably coupled to the transparent shell, the base may include an illuminator configured to illuminate the flowers within the interior portion, and a power supply configured to power the illuminator.

20 Claims, 6 Drawing Sheets

(56) References Cited

U.S. PATENT DOCUMENTS

| 2005/0157487 A1 | 7/2005 | Epstein |
| 2009/0084032 A1 | 4/2009 | Beeman et al. |
| 2012/0174870 A1* | 7/2012 | Grabois .............. A01K 63/003 |
| | | 119/253 |
| 2014/0268676 A1* | 9/2014 | Yang ...................... F21V 3/062 |
| | | 362/101 |

* cited by examiner

FLORAL DISPLAY SYSTEMS

CROSS REFERENCE TO RELATED APPLICATION

The present application is related to and claims priority to U.S. Provisional Patent Application No. 62/768,520 filed Nov. 16, 2018, which is incorporated by reference herein in its entirety.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

1. Field of the Invention

The present invention relates generally to the field of containers and more specifically relates to flower containers and devices.

2. Description of Related Art

Cut flowers are often given as gifts on various occasions. Unfortunately, cut flowers have a limited shelf life, and are adversely affected by elevated temperatures, drafts, low humidity, vibration, and other environmental factors. Cut flowers are disposed of once the flowers wilt or turn brown after a few days. A suitable solution is desired to prolong the usable life of cut flowers.

Prior attempts have been made to overcome the above-noted problems. For example, U.S. Pat. No. 6,039,453 to Shiuh-Liang Wang relates to a lighted water globe. The described lighted water globe includes a lighted water globe comprises a base having a hollowed interior and a water filled glass dome arrangement supported on the base. The glass dome arrangement has a lower portion accessible within the base interior and the lower portion has a window through which light may pass. A bundle of fiber optic elements is disposed within the glass dome arrangement, the fiber optic elements terminating at an end of the bundle adjacent the window. A light source is disposed in the base interior directing light to the bundle end through the window. A music box movement provides mechanical power to rotate an effects wheel to dynamically alter the light as it passes from the light source to the window and on to the bundle end of the fiber optic elements, creating interesting and changing lighting effects. The internal objects within the water globe may be made from a material which glows in the dark. Unfortunately, the Wang device is unsuitable for the display of cut flowers and foliage. More specifically, the Wang device utilizes synthetic foliage, which is permanently sealed within the globe.

BRIEF SUMMARY OF THE INVENTION

In view of the foregoing disadvantages inherent in the known containers art, the present disclosure provides a novel floral display system. The general purpose of the present disclosure, which will be described subsequently in greater detail, is to provide a device configured to keep cut flowers in a suspended state similar to their appearance when fresh cut.

A floral display device is disclosed herein. The floral display device includes a display enclosure that may include a transparent shell having an interior portion adapted to contain flowers and the liquid preservative, and an opening within the transparent shell to enable passage of the flowers and the liquid preservative therethrough, a liquid-tight closure configured to close the opening, and a holding clip configured to removably hold the flowers within the interior portion. A base may be removably coupled to the transparent shell. The base may include a display-enclosure receiver configured to removably receive the display enclosure, a display-enclosure retainer configured to removably retain the display enclosure within the display-enclosure receiver, an illuminator configured to illuminate the flowers within the interior portion, and a power supply configured to power the illuminator.

A method of using the floral display device is also disclosed herein. The method may comprise the steps of: a providing a floral display device for the display of flowers in a liquid preservative, the floral display device including a display enclosure may include the liquid preservative; a transparent shell may have an interior portion adapted to contain the flowers and the liquid preservative, and an opening within the transparent shell, the opening adapted to enable passage of the flowers and the liquid preservative through the transparent shell to the interior portion, a liquid-tight closure configured to close the opening, and a holding clip configured to removably hold the flowers within the interior portion; a base removably coupled to the transparent shell, the base may include a display-enclosure receiver configured to removably receive the display enclosure, a display-enclosure retainer configured to removably retain the display enclosure within the display-enclosure receiver, an illuminator configured to illuminate the flowers within the interior portion, a power supply configured to power the illuminator, and a support housing configured to supportively house the liquid-tight closure, the holding clip, the illuminator, and the power supply on a support surface; securing the flowers to the liquid-tight closure with the holding clip; filling the transparent shell with the liquid preservative; and coupling to the transparent shell to the base, wherein the flowers may be suspended within the liquid preservative. Even further, it provides such a method comprising the step of illuminating the flowers using the illuminator.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a floral display systems, constructed and operative according to the teachings of the present disclosure.

The various embodiments of the present invention will hereinafter be described in conjunction with the appended drawings, wherein like designations denote like elements.

DETAILED DESCRIPTION

Figure 1:
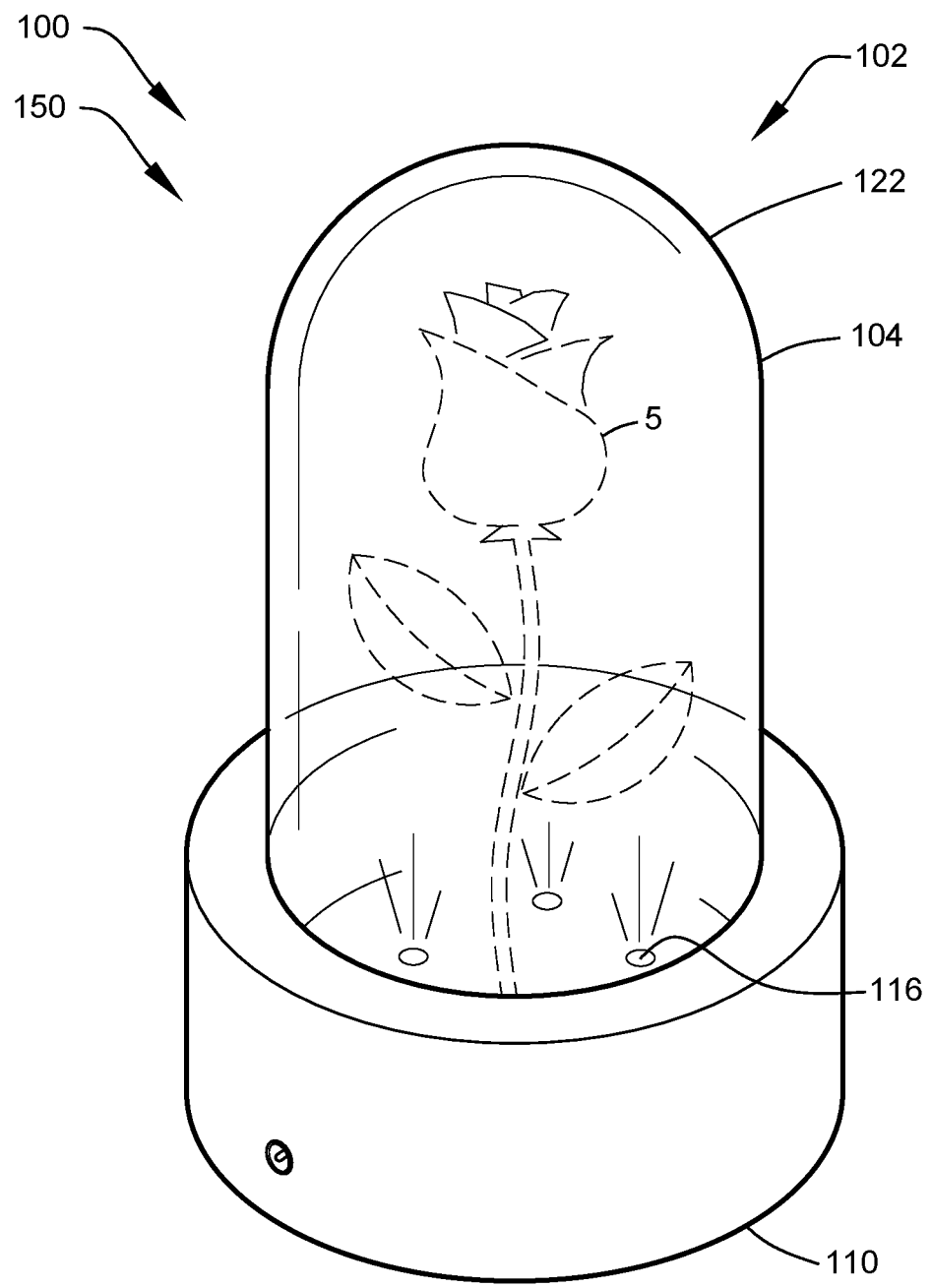
FIG. 1 is a front perspective view of the floral display device during an 'in-use' condition, according to an embodiment of the disclosure.

As discussed above, embodiments of the present disclosure relate to a containers and more particularly to a flowers display systems as used to improve the flower containers and devices.

Generally, this device is intended to help keep cut flowers in a suspended state similar to their appearance when fresh cut. It works by keeping the flowers sealed in an oil filled dome. Once inserted into the glass dome and sealed, the dome is lowered into the base and the bottom lid closes holding it inside. On the bottom lid there is an array of LEDs that can be controlled with a remote and can be changed to many different colors. The dome may be dry initially and the flower may be attached to the clip on the bottom of the transparent lid. The lid with the flower are screwed on to the dome/glass. Once the lid is on, the oil is added and the excess air is removed. The dome, flower are then inserted and locked into the base and turned over. The base holds batteries and can powered by AC current or the charged batteries for remote viewing.

The device is well suited as a display for intimate restaurant tables, mantles, desks and anywhere people want to appreciate the beauty of flowers for extended periods of time without the risk of insects or cleanup associated with the dying flowers. Knowing that a flower will last longer makes choosing a favorite flower at a flower shop a more enjoyable experience. The system may include a flower display enclosure including a transparent dome of glass or plastic removably coupled to a base having a bottom-lid. The transparent dome may enclose oil within to suspend and preserve the flower. The device is intended to help keep cut flowers in a suspended state similar to their appearance when fresh cut. The system may further comprise a flower anchoring assembly including a clip on the bottom of a lid-member. The lid-member holds the oil and flower inside the device. The flower may be attached to the clip. The lid-member with flower may then be screwed on to the transparent dome of glass. Once a flower is inserted into the transparent dome and sealed, the dome may be lowered into the base and the bottom-lid closes holding it inside. The base may house a battery power supply and may be connected to the bottom-lid supporting a lighting array. The lighting array may include a plurality of LED lights. The lighting array may be controlled with a remote and can be changed to many different colors. The lid-member may include a transparent section to allow light emitted from the lighting array to pass therethrough. The present device may help to extend the life of a cut flower by at least 1-2 weeks and allow for more aesthetically pleasing display options. The lower preserving system may further include an external power pack and power cord for recharging and powering the device. The base may include a receptacle for receiving the power cord. A remote control is further provided for controlling the lighting array color options.

Referring now more specifically to the drawings by numerals of reference, there is shown in FIGS. 1-5, various views of a floral display device 100 for the display of flowers 5 suspended in a liquid preservative 9. In the present disclosure, the term "flowers" shall be understood to include flowers, buds, foliage, fruits, seeds, leaves, stems, branches, and associated portions of plants. In addition, the term "flowers" shall be understood to include floral arrangements and similar aggregations containing non-plant decorative elements, such as, for example, holiday ornaments, ribbons, etc.

Figure 2:
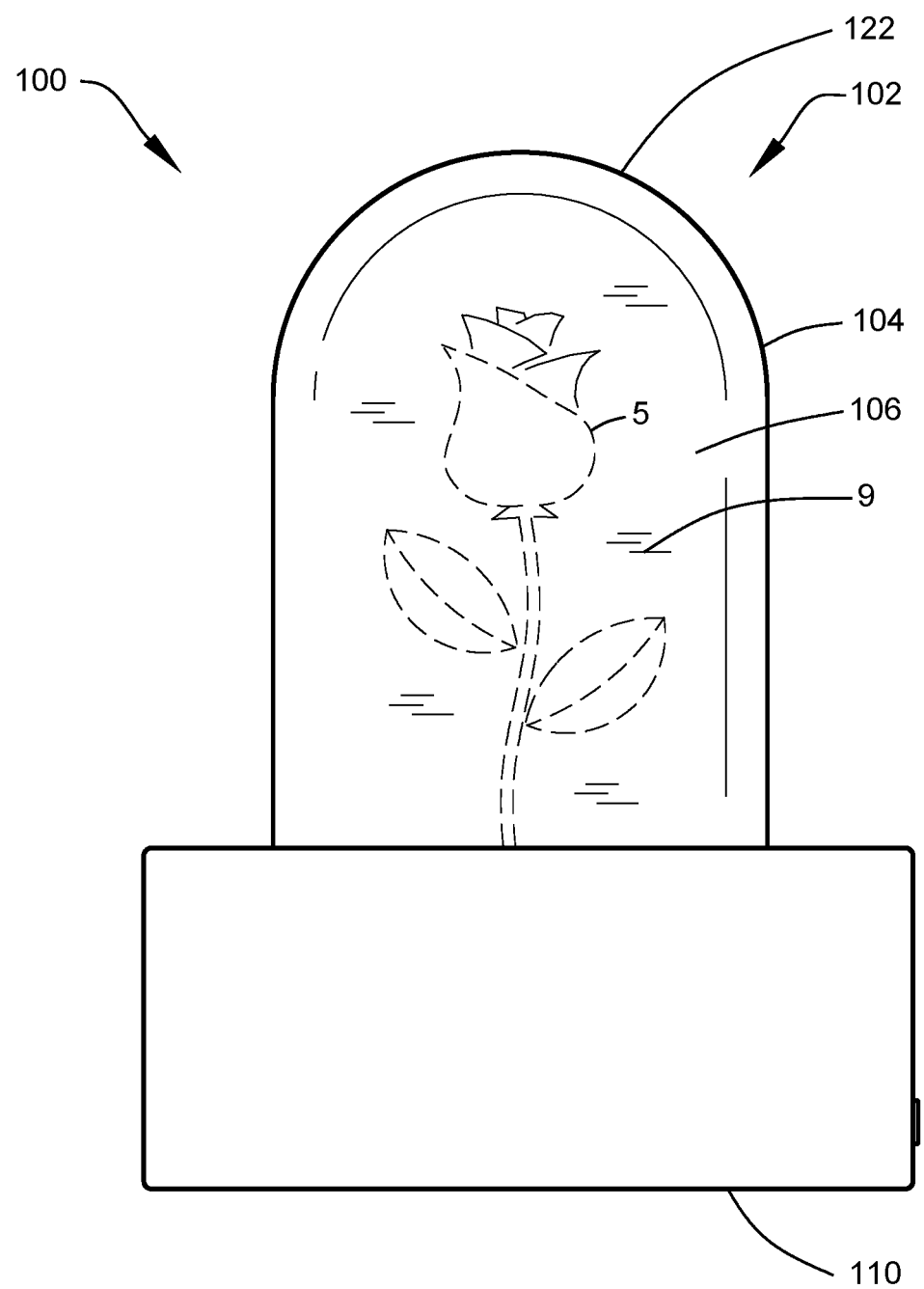
FIG. 2 is a front view of the floral display device of FIG. 1, according to an embodiment of the present disclosure.

FIG. 1 shows a floral display device 100 during an 'in-use' condition 150, according to an embodiment of the present disclosure. FIG. 2 shows a side view of the floral display device 100 of FIG. 1, according to an embodiment of the present disclosure. As illustrated, the floral display device 100 may include a display enclosure 102 including a transparent shell 104 having an interior portion 106 adapted to contain both the flowers 5 and a liquid preservative 9. The floral display device 100 helps keep cut flowers and similar foliage in a suspended state similar to their appearance when fresh cut.

Figure 3:
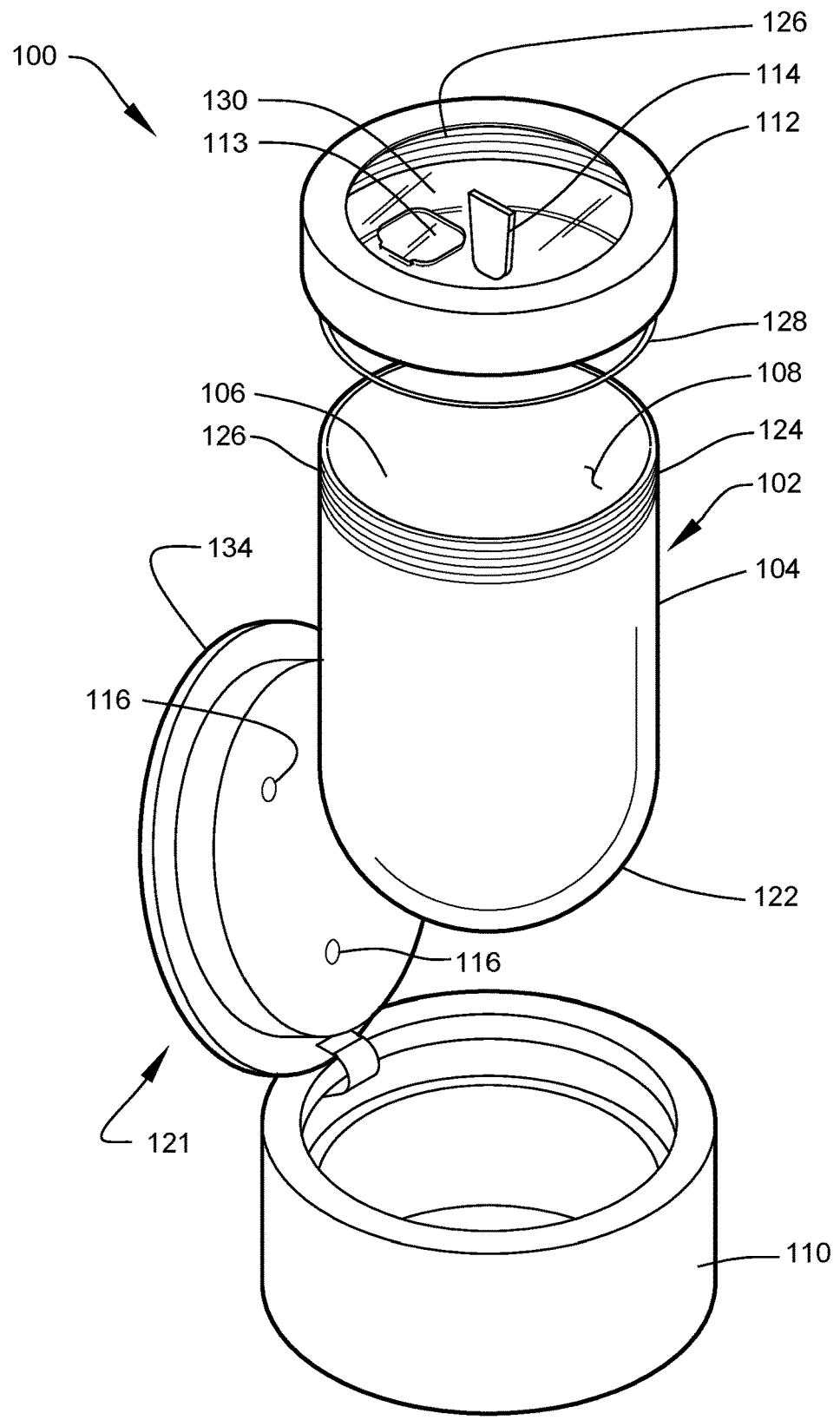
FIG. 3 is an exploded perspective view of the floral display device of FIG. 1, according to an embodiment of the present disclosure.
Figure 4:
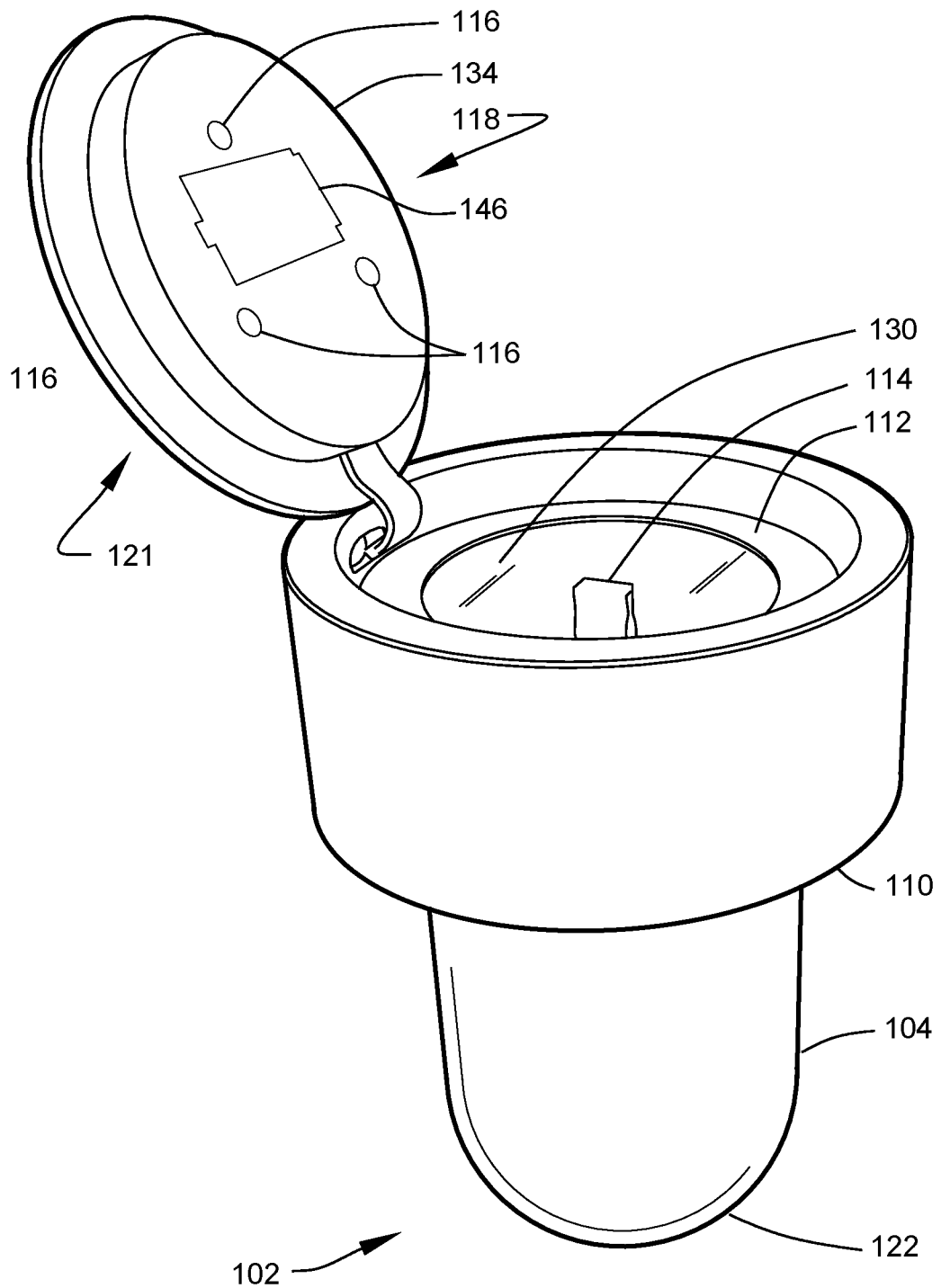
FIG. 4 is a bottom perspective view of the floral display device of FIG. 1, according to an embodiment of the present disclosure.

FIG. 3 shows an exploded perspective view of the floral display device 100 of FIG. 1, according to an embodiment of the present disclosure. FIG. 4 shows a bottom perspective view of the floral display device 100 of FIG. 1, according to an embodiment of the present disclosure.

The bottom of the display enclosure 102 may include an opening 108, within the transparent shell 104, to enable passage of the flowers 5 and the liquid preservative 9 through the wall of the transparent shell 104. A liquid-tight closure 112 may be provided to close the opening 108. The liquid-tight closure 112 may include a holding clip 114 configured to removably hold the flowers 5 within the interior portion 106.

The transparent shell 104 may include a cylindrical shape having a dome top 122 and a circular base portion 124. The circular base portion 124 may include the opening 108, as shown. The liquid-tight closure 112 and the transparent shell 104 may each include interengageable threads 126 allowing the two components to be removably joined. The liquid-tight closure 112 may include an annular seal 128 configured to form a liquid-tight seal when the threads 126 are interengaged. The liquid-tight closure 112 may also include a fill port 113 used to fill the transparent shell 104 after the liquid-tight closure 112 is engaged over the opening 108. The fill port 113 may be provided with a hinged door or removable cap that snaps or screws into position to seal the fill port 113 after the liquid preservative 9 has been installed.

The floral display device 100 may further include a base 110 configured to be removably coupled to the transparent shell 104, as shown. The base 110 may be configured to allow the floral display device 100 to rest on a supportive surface. The base 110 may include a display-enclosure receiver 120 configured to removably receive the display enclosure 102 and a display-enclosure retainer 121 configured to removably retain the display enclosure within the display-enclosure receiver. In the present disclosure, the display-enclosure retainer 121 may include a bottom lid 134 pivotally-coupled to the base 110, as shown. The bottom lid 134 may include a latch to maintain the bottom lid 134 in a closed position, thus retaining the display enclosure 102 within the base 110.

The holding clip 114 may be mounted to the liquid-tight closure 112, as shown. The holding clip 114 may be adapted to hold the flowers 5 by frictional engagement. The holding clip 114 may be fashioned in one piece, having two closely-spaced members forming a U-shaped body. Alternately, the holding clip 114 may include a set of gripping members held in adjustable contact by a spring.

Figure 5:
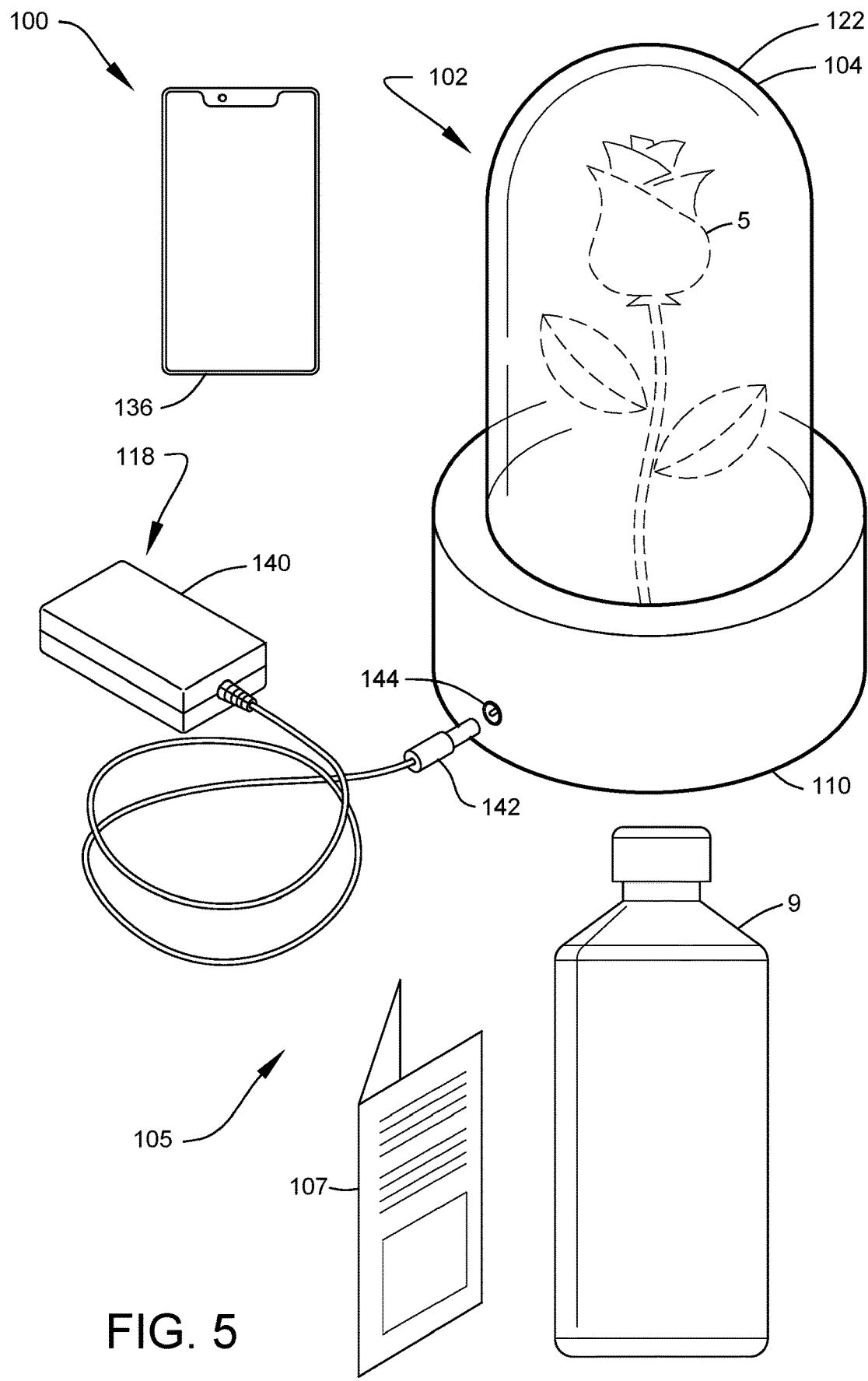
FIG. 5 is a flow diagram illustrating a method of use for floral display device, according to an embodiment of the present disclosure.

FIG. 5 shows a front perspective view of the floral display device 100 of FIG. 1, according to an embodiment of the present disclosure. The base 110 may further include an illuminator 116 configured to illuminate the flowers 5 within the interior portion 106. A power supply 118 may be provided to power the illuminator 116. The liquid-tight closure 112 may include a transparent closure portion 130 configured to pass light emitted by the illuminator 116.

The illuminator 116 may include one or more Light-Emitting Diodes (LED). The LED may be integrated within the bottom lid 134, as shown. The term "LED" should be understood to include light emitting diodes of all types, light emitting polymers, semiconductor dies that produce light in response to current, organic LEDs, electro-luminescent strips, and similar devices. Moreover, an "LED" may refer to a single light emitting diode having multiple semiconductor dies that are individually controlled. Upon reading this specification, it should be appreciated that, under appropriate circumstances, considering such issues as user preferences, design preference, electrical requirements, marketing preferences, cost, available materials, technological advances, etc., other illumination arrangements such as, for example, incandescent bulbs, fluorescent bulbs, laser emitters, other devices that are capable of receiving an electrical signal and producing a color of light in response to the signal, etc., may be sufficient.

The illuminator 116 may include at least one RGB-type LED. Such illuminators may include red, blue, and green light-emitting diodes. RGB-type light-emitting diodes are capable of producing millions of hues of light by selectively combining these three colors.

The illuminator 116 may be coupled with a microcontroller circuit, disposed in the base 110. The microcontroller may be configured to control the intensity and the color of the illuminator 116. The microcontroller may respond to a signal from another device or send a signal to another device. In one embodiment of the present disclosure, the microcontroller interoperates with a hand-held user controller 136 enabling remote user control of the microcontroller and the illuminator 116.

As above, the microcontroller circuit and user controller 136 may include wireless transmitters and/or receivers to enable wireless communications between the devices. The controller 136 may be a dedicated hand-held device. Alternately, the controller 136 may be a smart phone or similar device operating a user-control application. The controller 136 and illuminator 116 may operate wirelessly via one or more wireless communication protocols, for example, wireless connectivity using Wi-Fi, Bluetooth, infrared, etc. The microcontroller may include programming to allow the user to initiate one or more pre-programmed timers, lighting programs, sequences, etc. Those with ordinary skill in the art will now appreciate that upon reading this specification and by their understanding the art of microprocessor control and wireless communication as described herein, methods of implementing such circuits will be understood by those knowledgeable in such art.

The power supply 118 may include an external electrical power source 140 having an external power coupler 142. The external electrical power source 140 may be a power adapter for an AC mains wall outlet. The external electrical power source 140 may be an AC adapter, AC/DC adapter, or AC/DC converter. Use of the external electrical power source 140 allows portability of the floral display device 100 powered either by mains or battery without the added bulk of internal power components, and makes it unnecessary to produce equipment for use only with a specified power source; thus, the floral display device 100 can be powered from 120 VAC, 230 VAC mains, or a vehicle battery by using a compatible accessory adapter. The external electrical power source 140 may include a linear power supply, containing a transformer to convert the mains electricity voltage to the lower voltage, a rectifier to convert the AC waveform to DC, and filters to smooth the resulting output. This arrangement transforms the 120 or 240 volt mains power to a lower voltage usable by the device.

A power-coupler socket 144 may be mounted within the base 110, as shown. The power-coupler socket 144 may be adapted to be operably coupleable with the external power coupler 142. The power supply 118 may include an electrical battery 146 housed within the base 110, as shown. The electrical battery 146 may be one or more primary-type cells (i.e., single-use or "disposable") or may include one or more secondary cells (i.e., rechargeable).

The transparent shell 104 may be cylindrical shape having a dome top and a circular base portion, as shown. The transparent shell 104 may be constructed from glass or a plastic material. Upon reading this specification, it should be appreciated that, under appropriate circumstances, considering such issues as user preferences, design preference, structural requirements, marketing preferences, cost, available materials, technological advances, etc., other shell arrangements such as, for example, alternate shapes, alternate materials, etc., may be sufficient.

The floral display device 100 may further comprise the liquid preservative 9. The liquid preservative 9 may include oil, more specifically mineral oil. Upon reading this specification, it should be appreciated that, under appropriate circumstances, considering such issues as user preferences, design preference, preservation requirements, marketing preferences, cost, available materials, technological advances, etc., other liquid preservative arrangements such as, for example, other oils, glycerin, aqueous-based preservative solutions, etc., may be sufficient.

According to one embodiment, the floral display device 100 may be arranged as a kit 105. In particular, the floral display device 100 may further include a set of instructions 107. The instructions 107 may detail functional relationships in relation to the structure of the floral display device 100 such that the floral display device 100 can be used, maintained, or the like, in a preferred manner. In one embodiment of the present disclosure, the kit 105 may include the floral display device 100, power supply 118, a controller 136, and a bottle of liquid preservative 9.

Figure 6:
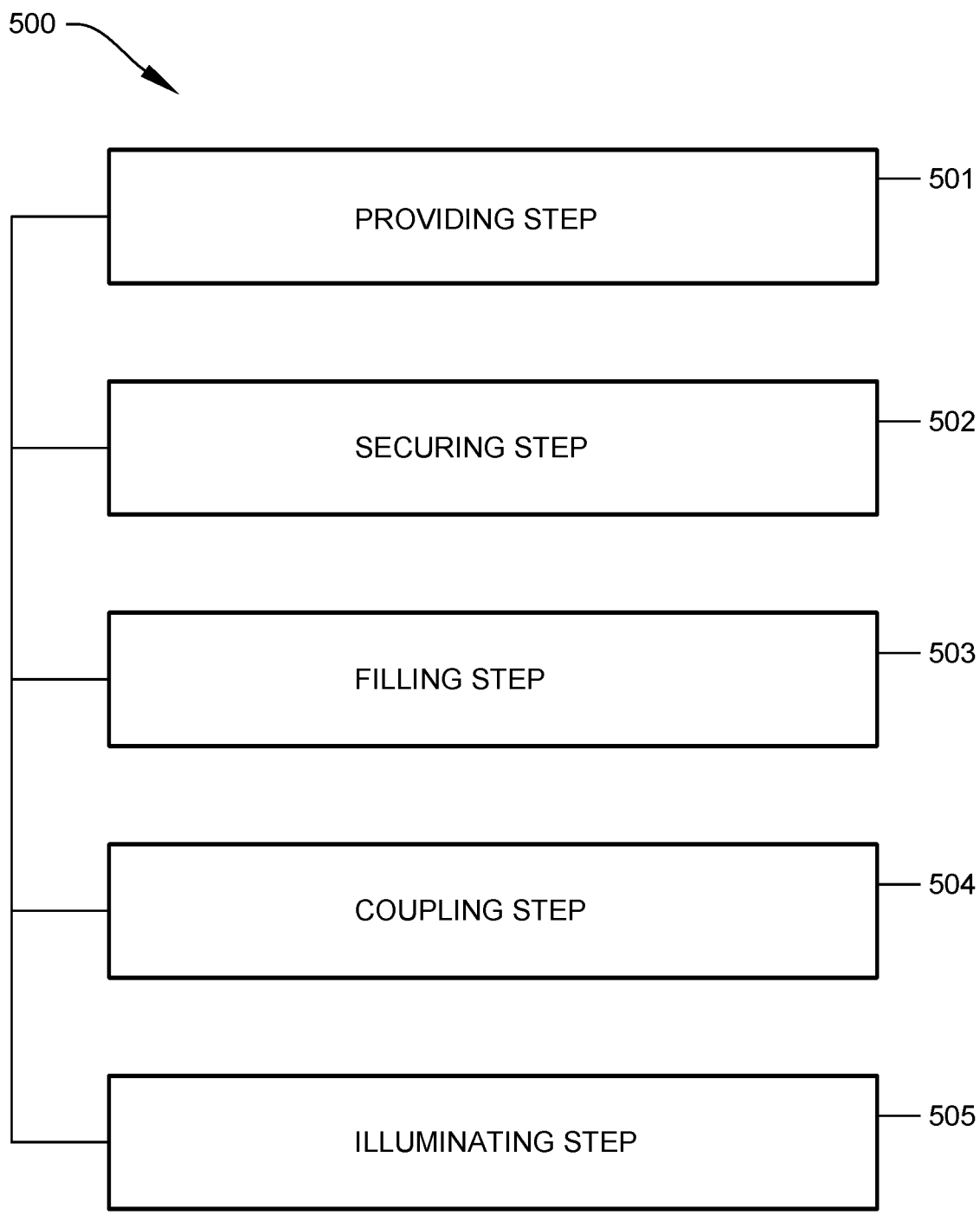
FIG. 6 is a flow diagram illustrating a method of use for floral display device, according to an embodiment of the present disclosure.

FIG. 6 is a flow diagram illustrating a method 500 of using the floral display device 100, according to an embodiment of the present disclosure. As illustrated, the method 500 may include the steps of: step one 501, providing a floral display device 100 for the display of flowers 5 in a liquid preservative 9, the floral display device 100 comprising a display enclosure 102 including the liquid preservative 9; a transparent shell 104 having an interior portion 106 adapted to contain the flowers 5 and the liquid preservative 9, and an opening 108 within the transparent shell 104, the opening 108 adapted to enable passage of the flowers 5 and the liquid preservative 9 through the transparent shell 104 to the interior portion 106; a liquid-tight closure 112 configured to close the opening 108, a holding clip 114 configured to removably hold the flowers 5 within the interior portion 106; a base 110 removably coupled to the transparent shell 104, the base 110 including a display-enclosure receiver 120 configured to removably receive the display enclosure 102 and a display-enclosure retainer 121 configured to removably retain the display enclosure within the display-enclosure receiver; an illuminator 116 configured to illuminate the flowers 5 within the interior portion 106, and a power supply 118 configured to power the illuminator 116; step two 502, securing the flowers 5 to the liquid-tight closure 112 with the holding clip 114; step three 503, filling the transparent shell 104 with the liquid preservative 9; and step four 504, coupling the transparent shell 104 to the base 110, wherein the flowers 5 is suspended within the liquid preservative 9. Even further, method 500 may further comprises the step five 505, of illuminating the flowers 5 using the illuminator 116.

It should be noted that step 505 is an optional step and may not be implemented in all cases. Optional steps of method 500 are illustrated using dotted lines in FIG. 6 so as to distinguish them from the other steps of method 500. It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for floral display device 100 (e.g., different step orders within above-mentioned list, elimination or addition of certain steps, including or excluding certain maintenance steps, etc.), are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A floral display device for the display of flowers suspended in a liquid preservative, the floral display device comprising:
   a display enclosure including
      a transparent shell having an interior portion adapted to contain the flowers and the liquid preservative,
      an opening within the transparent shell to enable passage of the flowers and the liquid preservative therethrough,
      a liquid-tight closure configured to close the opening, and
      a holding clip configured to removably hold the flowers within the interior portion;
   a base removably coupled to the transparent shell, the base including
      a display-enclosure receiver configured to removably receive the display enclosure, the display-enclosure receiver being annular and straight-walled,
      a display-enclosure retainer being structurally integral to and diametrically smaller than the display-enclosure receiver, the display-enclosure retainer being configured to removably retain the display enclosure within the display-enclosure receiver,
      a bottom-lid able to retain the display enclosure to the base by containing the liquid-tight closure between the display-enclosure retainer and the bottom-lid, the bottom-lid being hingedly attached to the base,
      an illuminator configured to illuminate the flowers within the interior portion, and
      a power supply configured to power the illuminator.

2. The floral display device of claim 1, wherein the holding clip is mounted to the liquid-tight closure.

3. The floral display device of claim 1, wherein
   the transparent shell comprises a cylindrical shape having a dome top and a circular base portion; and
   the circular base portion comprises the opening.

4. The floral display device of claim 1, wherein
   the liquid-tight closure and the transparent shell each comprise interengageable threads; and
   the liquid-tight closure comprises a seal configured to form a liquid-tight seal when the interengageable threads are interengaged.

5. The floral display device of claim 1, wherein the illuminator comprises a light-emitting diode.

6. The floral display device of claim 5, wherein the liquid-tight closure comprises a transparent closure portion configured to pass light emitted by the illuminator.

7. The floral display device of claim 6, wherein
   the at least one light-emitting diode is integrated within the bottom lid.

8. The floral display device of claim 1, wherein the transparent shell is constructed from glass.

9. The floral display device of claim 1, wherein the transparent shell is constructed from a plastic material.

10. The floral display device of claim 1, wherein the illuminator comprises at least one RGB-type light-emitting diode.

11. The floral display device of claim 1, further comprising a user controller adapted to enable user control of the at least one RGB-type light-emitting diode.

12. The floral display device of claim 1, wherein the power supply comprises
   an external electrical power source having an external power coupler; and
   a power-coupler socket mounted within the base, the power-coupler socket adapted to be operably coupleable with external power coupler.

13. The floral display device of claim 1, wherein the power supply comprises an electrical battery housed within the base.

14. The floral display device of claim 1, further comprising the liquid preservative.

15. The floral display device of claim 1, wherein the liquid preservative comprises oil.

16. The floral display device of claim 15, wherein the oil comprises mineral oil.

17. A floral display device for the display of flowers in a liquid preservative, the floral display device comprising:
- a display enclosure including
  - a transparent shell having an interior portion adapted to contain the flowers and the liquid preservative,
  - an opening within the transparent shell to enable passage of the flowers and the liquid preservative therethrough,
  - a liquid-tight closure configured to close the opening, and
  - a holding clip configured to removably hold the flowers within the interior portion; and
- a base removably coupled to the transparent shell, the base including
  - a display-enclosure receiver configured to removably receive the display enclosure, the display-enclosure receiver being annular and straight-walled,
  - a display-enclosure retainer being structurally integral to and diametrically smaller than the display-enclosure receiver, the display-enclosure retainer being configured to removably retain the display enclosure within the display-enclosure receiver,
  - a bottom-lid able to retain the display enclosure to the base by containing the liquid-tight closure between the display-enclosure retainer and the bottom-lid, the bottom-lid being hingedly attached to the base,
  - an illuminator configured to illuminate the flowers within the interior portion,
  - a power supply configured to power the illuminator; and
  - the liquid preservative;
- wherein the holding clip is mounted to the liquid-tight closure;
- wherein the transparent shell comprises a cylindrical shape having a dome top and a circular base portion;
- wherein the circular base portion comprises the opening;
- wherein the liquid-tight closure and the transparent shell each comprise inter-engageable threads;
- wherein the liquid-tight closure comprises a fill port;
- wherein the liquid-tight closure comprises a seal configured to form a liquid-tight seal when the inter-engageable threads are interengaged;
- wherein the illuminator comprises an RGB-type light-emitting diode;
- wherein the liquid-tight closure comprises a transparent closure portion illuminator comprises at least one light-emitting diode;
- wherein the at least one light-emitting diode is integrated within the bottom lid;
- further comprising a user controller adapted to enable user control of the at least one RGB-type light-emitting diode;
- further comprising a user controller adapted to enable user control of the at least one RGB-type light-emitting diode;
- wherein an external electrical power source comprises an external power coupler, a power socket mounted within the base;
- wherein the power socket adapted to be operably coupleable with external power coupler; and
- wherein the liquid preservative comprises mineral oil.

18. The floral display device of claim 17, further comprising set of instructions; and
- wherein the floral display device is arranged as a kit.

19. A method of using a floral display device, the method comprising the steps of:
- providing
- the floral display device of claim 17;
- securing the flowers to the liquid-tight closure with the holding clip;
- filling the transparent shell with the liquid preservative; and
- coupling to the transparent shell to the base, wherein the flowers is suspended within the liquid preservative.

20. The method of claim 19, further comprising the steps of illuminating the flowers using the illuminator.

* * * * *